(12) United States Patent
Kuang et al.

(10) Patent No.: US 12,114,398 B2
(45) Date of Patent: Oct. 8, 2024

(54) METHOD FOR REPORTING BAND INFORMATION AND RELATED DEVICE

(71) Applicant: Huawei Technologies Co., Ltd., Shenzhen (CN)

(72) Inventors: Yiru Kuang, Beijing (CN); Bingzhao Li, Beijing (CN); Hongping Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 313 days.

(21) Appl. No.: 17/608,072

(22) PCT Filed: Feb. 5, 2021

(86) PCT No.: PCT/CN2021/075445
§ 371 (c)(1),
(2) Date: Nov. 1, 2021

(87) PCT Pub. No.: WO2021/160029
PCT Pub. Date: Aug. 19, 2021

(65) Prior Publication Data
US 2022/0182816 A1    Jun. 9, 2022

(30) Foreign Application Priority Data

Feb. 13, 2020  (CN) .................. 202010091552.3
Mar. 4, 2020   (CN) .................. 202010144062.5

(51) Int. Cl.
*H04W 8/24*      (2009.01)
*H04W 72/02*     (2009.01)
*H04W 72/0453*   (2023.01)

(52) U.S. Cl.
CPC ............ *H04W 8/24* (2013.01); *H04W 72/02* (2013.01); *H04W 72/0453* (2013.01)

(58) Field of Classification Search
CPC ... H04W 8/24; H04W 72/02; H04W 72/0453; H04W 72/20; H04W 88/06; H04W 72/51;
(Continued)

(56) References Cited

U.S. PATENT DOCUMENTS

2018/0279116 A1\*  9/2018  Van Der Velde ..... H04L 5/0048
2019/0150031 A1   5/2019  Balasubramanian et al.
(Continued)

FOREIGN PATENT DOCUMENTS

CN   107040355 A    8/2017
CN   107251630 A   10/2017
(Continued)

OTHER PUBLICATIONS

Ericsson et al., "Handling of fallback band combinations", 3GPP TSG-RAN WG2 #107bis, R2-1913525, Chongqing, China, Oct. 14-18, 2018, 3 pages.
(Continued)

*Primary Examiner* — Yu-Wen Chang
(74) *Attorney, Agent, or Firm* — Slater Matsil, LLP

(57) ABSTRACT

In a method, a first band combination set reported by a terminal device may include a first band combination and a second band combination, the first band combination is a fallback band combination that has a same capability as the
(Continued)

second band combination, and the first band combination and the second band combination correspond to different radio access technology types.

18 Claims, 9 Drawing Sheets

(58) Field of Classification Search
CPC ..... H04W 72/23; H04W 72/21; H04W 76/16; H04L 5/0053; H04L 5/0094; H04L 5/001
See application file for complete search history.

(56) References Cited

U.S. PATENT DOCUMENTS

| | | | |
|---|---|---|---|
| 2020/0037383 | A1 | 1/2020 | AAlvarino et al. |
| 2020/0092886 | A1* | 3/2020 | Kim .................. H04W 88/02 |
| 2020/0100236 | A1* | 3/2020 | Tenny ................ H04W 8/22 |
| 2020/0329369 | A1* | 10/2020 | Pals ................... H04B 7/0417 |
| 2021/0377941 | A1* | 12/2021 | Balakrishnan .... H04W 72/0453 |

FOREIGN PATENT DOCUMENTS

| | | | | |
|---|---|---|---|---|
| CN | 108632811 | A | | 10/2018 |
| CN | 110199537 | A | | 9/2019 |
| CN | 110226338 | A * | | 9/2019 .......... H04W 72/048 |
| CN | 110249660 | A | | 9/2019 |
| CN | 110383871 | A | | 10/2019 |
| CN | 110430564 | A | | 11/2019 |
| CN | 111432487 | A | | 7/2020 |
| KR | 20180090177 | A | | 8/2018 |
| RU | 2657869 | C2 | | 6/2018 |
| WO | 2019069285 | A1 | | 4/2019 |
| WO | 2020067987 | A1 | | 4/2020 |

OTHER PUBLICATIONS

Nokia et al., "On FR2 CA fallbacks", 3GPP TSG-RAN WG2 Meeting #107bis, R2-1913022, Chongqing, China, Oct. 14-18, 2019, 30 pages.

3GPP TS 38.306 V15.8.0 (Dec. 2019), 3rd Generation Partnership Project; Technical Specification Group Radio Access Network; NR; User Equipment (UE) radio access capabilities (Release 15), 60 pages.

Huawei et al., "CR on fallback BC reporting", 3GPP TSG-RAN WG2 Meeting #109, R2-2002347, Electronic, Feb. 24-Mar. 6, 2020, 5 pages.

3GPP TS 38.331 V15.8.0 (Dec. 2019), 3rd Generation Partnership Project; Technical Specification Group Radio Access Network; NR; Radio Resource Control (RRC) protocol specification (Release 15), 532 pages.

Huawei, et al., "CR for frequency band filtering setting," 3GPP TSG RAN WG2 #105 36.331 V15.4.0, R2-1901692, Feb. 25-Mar. 1, 2019, 5 pages.

Ericsson et al., "Handling of fallback band combinations", 3GPP TSG-RAN WG2 #107bis, Tdoc R2-1913525, Chongqing, China, Oct. 14-18, 2019, 3 pages.

Huawei et al., "Avoiding duplication BCs report in NR SA and MR-DC", 3GPP TSG-RAN WG2 #104, R2-1818029, Spokane, WA, US, Nov. 12-16, 2018, 2 pages.

ETSI TS 136 306 V15.7.0 (Jan. 2020), LTE; Evolved Universal Terrestrial Radio Access (E-UTRA); User Equipment (UE) radio access capabilities (3GPP TS 36.306 version 15.7.0 Release 15), 124 pages.

Ericsson (Rapporteur), R2-1916350, Miscellaneous non-controversial corrections Set IV, 3GPP TSG-RAN2, Meeting #108, 3GPP server release date (Nov. 25, 2019) 515 pages.

* cited by examiner

New radio container (NR container)

NR SA BC1 (N_band1, N_band2)

NR SA BC2 (N_band1)
NR SA BC3 (N_band2)

NR SA BC4 (N_band3)

NR SA BC5 (N_band4, N_band5)
NR SA BC6 (N_band4)
NR SA BC7 (N_band5)
...

Multi-radio dual connectivity container (MR-DC container)

NE-DC BC1 (L_band1, N_band3)
NE-DC BC2 (L_band1, L_band2, N_band4, N_band 5)

NE-DC BC3 (L_band2, N_band4, N_band5)
NE-DC BC4 (L_band1, N_band4, N_band5)
...

NR SA BC: new radio standalone band combination;
NE-DC BC: new radio-evolved universal mobile telecommunications system terrestrial radio access-dual connectivity band combination;
L_band: long term evolution band combination; and
N_band: new radio band combination

FIG. 3

METHOD FOR REPORTING BAND INFORMATION AND RELATED DEVICE

CROSS-REFERENCE TO RELATED APPLICATIONS

This application is a national stage of International Application No. PCT/CN2021/075445, filed on Feb. 5, 2021, which claims priority to Chinese Patent Application No. 202010144062.5, filed on Mar. 4, 2020 and Chinese Patent Application No. 202010091552.3, filed on Feb. 13, 2020. All of the aforementioned patent applications are hereby incorporated by reference in their entireties.

TECHNICAL FIELD

This application relates to the field of communications technologies, and in particular, to a method for reporting band information and a related device.

BACKGROUND

In a communications system, after accessing a network, a terminal device needs to report terminal device capability information to a base station and a core network. For example, a network device sends a terminal device capability enquiry message to the terminal device, and the terminal device capability enquiry message includes RAT type indications of some radio access technologies (radio access technology, RAT) that need to be requested. Correspondingly, the terminal device sends the terminal device capability information to the network device, and the terminal device capability information includes related terminal device capability information in these radio access technologies.

For example, the related capability information includes band combination (band combination, BC) information. If RAT types indicated by the RAT type indications include new radio NR, the terminal device capability information may include a new radio standalone band combination (New radio standalone band combination, NR SA BC) and a new radio dual connectivity band combination (New radio Dual Connectivity, NR-DC BC). If RAT types indicated by the RAT type indications include evolved universal mobile telecommunications system terrestrial radio access (Evolved-UMTS Terrestrial Radio Access, E-UTRA-NR), the terminal device capability information may include an evolved universal mobile telecommunications system terrestrial radio access-new radio-dual connectivity (E-UTRA-NR Dual Connectivity, EN-DC) BC and a new radio-evolved universal mobile telecommunications system terrestrial radio access-dual connectivity (NR-E-UTRA Dual Connectivity, NE-DC) BC; or the like. To reduce overheads required for reporting the terminal device capability information, for all band combinations that are determined based on the RAT type indications and that are supported by the terminal device, the terminal device removes a fallback band combination that has a same capability as one of the band combinations, and does not report the band combination. A band combination 1 and a band combination 2 are used as an example. The band combination 1 is a band combination that has a same capability as the band combination 2 and that is obtained after the band combination 2 is fallen back. In this case, the terminal device does not report the band combination 1.

However, it is assumed that the band combination 1 and the band combination 2 correspond to different RAT types, for example, a RAT type 1 and a RAT type 2. In this case, if the terminal device does not report the band combination 1, when determining a band combination corresponding to the RAT type 1, the network device further needs to consider a band combination corresponding to another RAT type, for example, the band combination 2 corresponding to the RAT type 2, to obtain the band combination 1. This causes a relatively heavy processing load for the network device.

SUMMARY

Embodiments of this application provide a method for reporting band information and a related device, to help reduce a processing load of a network device.

According to a first aspect, this application provides a method for reporting band information. In the method, a terminal device may determine a first band combination set to be sent by the terminal device, and further report the first band combination set. The first band combination set includes a first band combination and a second band combination, the first band combination is a fallback band combination that has a same capability as the second band combination, and the first band combination and the second band combination correspond to different radio access technology types.

It can be learned that, in this application, not all fallback band combinations supported by the terminal device are not explicitly reported, but a band combination of a type of the first band combination is explicitly reported, so that a network device can directly obtain a band combination of a type of the band combination. This avoids a problem that a processing load is relatively heavy because the network device further needs to view band combinations corresponding to a plurality of radio access technology types.

Optionally, the first band combination set is a subset of a second band combination set. The second band combination set is a set including a band combination that is determined by the terminal device and that is supported by the terminal device, for example, a set determined based on a terminal device capability enquiry message.

Optionally, the first band combination set does not include a third band combination, the third band combination is a fallback band combination that has a same capability as the second band combination, and the third band combination and the second band combination correspond to a same radio access technology type.

The first band combination, the second band combination, and the third band combination represent types of band combinations, and are not limited to a specific band combination. To be specific, the first band combination set may include at least one band combination of a type of the first band combination and at least one band combination of a type of the second band combination, but does not include a band combination of a type of the third band combination.

It can be learned that in this application, the band combination of the type of the third band combination is not explicitly reported, and therefore overheads required for reporting a band combination set are reduced. In addition, in this application, for a fallback band combination supported by the terminal device, the band combination of the type of the first band combination is explicitly reported, and the band combination of the type of the third band combination is not reported. Therefore, when determining a band combination corresponding to a RAT type, the network device only needs to consider a band combination that is in the first band combination set and that corresponds to the RAT type, to obtain all band combinations corresponding to the RAT type. This reduces a processing load of the network device.

The fallback band combination is a band combination obtained by releasing at least one secondary cell (SCell), or an uplink configuration of at least one secondary cell, or a secondary cell group (Secondary Cell Group, SCG) from the second band combination. The second band combination may be a large band combination supported by the terminal device.

In an optional implementation, the terminal device may determine the second band combination set supported by the terminal device. The second band combination set may include one or more band combinations supported by the terminal device in one or more radio access technologies, so that the terminal device can determine the to-be-sent first band combination set based on the second band combination set.

In an optional implementation, the second band combination set includes the first band combination, the second band combination, and the third band combination, and the terminal device may remove the third band combination from the second band combination set, to obtain the first band combination.

In another optional implementation, the second band combination set includes the second band combination and a fourth band combination. The terminal device may remove the fourth band combination from the second band combination set, and add the first band combination to the second band combination set, to obtain the first band combination set. The fourth band combination is a fallback band combination that has a same capability as the second band combination.

Optionally, the first band combination is a new radio standalone (NR SA) band combination, and the second band combination is a new radio-evolved universal mobile telecommunications system terrestrial radio access-dual connectivity (NE-DC) band combination. A radio access technology type corresponding to the first band combination is new radio (NR), and a radio access technology type corresponding to the second band combination is evolved universal mobile telecommunications system terrestrial radio access (EUTRA-NR).

In an optional implementation, the terminal device sends first indication information, and the first indication information is used to indicate that a band combination set from the terminal device includes the first band combination. It can be learned that this implementation helps notify the network device that the network device can explicitly obtain the first band combination, without a need to determine, with reference to a band combination corresponding to a radio access technology type, a band combination corresponding to another radio access technology type. This reduces implementation complexity of the network device.

Optionally, the first indication information is used to indicate that a band combination information reporting rule used by the terminal device is that the first band combination set includes the first band combination and the second band combination, but does not include the third band combination. This implementation helps reduce implementation complexity of the network device and reduce overheads required for reporting a supported band combination by the terminal device.

Optionally, the band combination information reporting rule may include at least two of the following: the first band combination set includes the first band combination and the second band combination, but does not include the third band combination; the first band combination set includes the first band combination, the second band combination, and the third band combination; and the first band combination set includes the first band combination, but does not include the second band combination and the third band combination. In this case, the first indication information may be a plurality of optional values, and each optional value corresponds to one band combination information reporting rule. This helps the network device determine, according to a corresponding rule, a band combination supported by the terminal device.

In an optional implementation, the terminal device receives second indication information from the network device, and the second indication information is used to indicate that the band combination set from the terminal device is allowed to include the first band combination. It can be learned that this implementation indicates that the terminal device is allowed to explicitly report the first band combination, and further the terminal device can explicitly report the first band combination. Optionally, the terminal device may indicate, to the network device by using the first indication information, whether the first band combination is explicitly reported.

In an optional implementation, the third band combination includes a fifth band combination, and the first band combination does not include the fifth band combination. The fifth band combination is a fallback band combination that has a same capability as the second band combination, and the fifth band combination and the second band combination correspond to different radio access technology types. The fifth band combination is not reported, so that it can be ensured that when determining a to-be-added fallback band combination, the network device only needs to consider a band combination obtained after a large band combination corresponding to a same RAT type is fallen back, and overheads required for reporting performed by the terminal device can be reduced.

In an optional implementation, the first band combination set does not include the fifth band combination.

In an optional implementation, the first band combination includes a fifth band combination, and the third band combination does not include the fifth band combination. The fifth band combination is a fallback band combination that has a same capability as the second band combination, and the fifth band combination and the second band combination correspond to a same radio access technology type. The fifth band combination is reported, so that it can be ensured that when determining a to-be-added fallback band combination, the network device only needs to consider a band combination obtained after a large band combination corresponding to a same RAT type is fallen back, and processing complexity of the terminal device can be reduced.

In an optional implementation, the first band combination set includes the fifth band combination.

According to a second aspect, this application further provides a method for reporting band information. The method for reporting band information is described from a perspective of a network device. The network device receives a first band combination set from a terminal device, where the first band combination set includes a first band combination and a second band combination, the first band combination is a fallback band combination that has a same capability as the second band combination, and the first band combination and the second band combination correspond to different radio access technology types. The network device determines, based on the first band combination set, a second band combination set supported by the terminal device.

Optionally, the first band combination set is a subset of the second band combination set. The second band combination set is a set including a band combination that is determined by the terminal device and that is supported by the terminal device, for example, a set determined based on a terminal device capability enquiry message.

Optionally, the first band combination set does not include a third band combination, the third band combination is a fallback band combination that has a same capability as the second band combination, and the third band combination and the second band combination correspond to a same radio access technology type.

The fallback band combination is a band combination obtained by releasing at least one secondary cell, or an uplink configuration of at least one secondary cell, or a secondary cell group from the second band combination.

In an optional implementation, that the network device determines, based on the first band combination set, a second band combination set supported by the terminal device includes: The network device adds the third band combination to the first band combination set, to obtain the second band combination set.

In an optional implementation, the first band combination is a new radio standalone (NR SA) band combination, and the second band combination is a new radio-evolved universal mobile telecommunications system terrestrial radio access-dual connectivity (NE-DC) band combination.

In an optional implementation, a radio access technology type corresponding to the first band combination is nr, and a radio access technology type corresponding to the second band combination is eutra-nr.

In an optional implementation, the network device receives first indication information, and the first indication information is used to indicate that a band combination set from the terminal device includes the first band combination.

In an optional implementation, the network device sends second indication information, and the second indication information is used to indicate that the band combination set from the terminal device is allowed to include the first band combination.

In an optional implementation, the third band combination includes a fifth band combination, and the first band combination does not include the fifth band combination. The fifth band combination is a fallback band combination that has a same capability as the second band combination, and the fifth band combination and the second band combination correspond to different radio access technology types. The fifth band combination is not reported, so that it can be ensured that when determining a to-be-added fallback band combination, the network device only needs to consider a band combination obtained after a large band combination corresponding to a same RAT type is fallen back, and overheads required for reporting performed by the terminal device can be reduced.

In an optional implementation, the first band combination set does not include the fifth band combination.

In an optional implementation, the first band combination includes a fifth band combination, and the third band combination does not include the fifth band combination. The fifth band combination is a fallback band combination that has a same capability as the second band combination, and the fifth band combination and the second band combination correspond to a same radio access technology type. The fifth band combination is reported, so that it can be ensured that when determining a to-be-added fallback band combination, the network device only needs to consider a band combination obtained after a large band combination corresponding to a same RAT type is fallen back, and processing complexity of the terminal device can be reduced.

In an optional implementation, the first band combination set includes the fifth band combination. For related content in this aspect, refer to the descriptions in the first aspect. Details are not described herein again.

According to a third aspect, an embodiment of this application further provides a terminal device. The terminal device may be an apparatus in the terminal device, or an apparatus that can be used together with a network device. The terminal device has some or all of the functions of the terminal device in the method example in the first aspect. For example, the terminal device may have functions of implementing some or all of the embodiments of this application, or may have a function of implementing any embodiment of this application. The function may be implemented by hardware, or may be implemented by hardware executing corresponding software. The hardware or software includes one or more units or modules corresponding to the foregoing functions.

In a possible design, a structure of the terminal device may include a processing unit and a transceiver unit. The processing unit is configured to support the terminal device in performing a corresponding function in the method provided in the first aspect. The transceiver unit is configured to support communication between the terminal device and another device, and the another device may be the network device. The terminal device may further include a storage unit. The storage unit is configured to couple to the processing unit and the transceiver unit, and stores program instructions and data that are necessary for the terminal device.

In an implementation, the terminal device includes a transceiver unit and a processing unit.

The processing unit is configured to determine a first band combination set to be sent by the terminal device. The first band combination set includes a first band combination and a second band combination, the first band combination is a fallback band combination that has a same capability as the second band combination, and the first band combination and the second band combination correspond to different radio access technology types.

The transceiver unit is configured to send the first band combination set to the network device.

That the processing unit determines a first band combination set to be sent by the terminal device is specifically: The processing unit determines a second band combination set supported by the terminal device, and determines the to-be-sent first band combination set based on the second band combination set, where the first band combination set is a subset of the second band combination set.

In an optional implementation, that the processing unit determines the to-be-sent first band combination set based on the second band combination set is specifically: The processing unit removes a third band combination from the second band combination set, to obtain the first band combination set.

In an optional implementation, that the processing unit determines the to-be-sent first band combination set based on the second band combination set is specifically: The processing unit removes a fourth band combination from the second band combination set, and adds the first band combination to the second band combination set, to obtain the first band combination set, where the fourth band combination is a fallback band combination that has a same capability as the second band combination.

In an implementation, the terminal device includes a processor and a transceiver.

The processor is configured to determine a first band combination set to be sent by the terminal device. The first band combination set includes a first band combination and a second band combination, the first band combination is a fallback band combination that has a same capability as the second band combination, and the first band combination and the second band combination correspond to different radio access technology types.

The transceiver is configured to send the first band combination set to the network device.

In a specific implementation process, the processor may be configured to perform, for example, but not limited to, baseband related processing; and the transceiver may be configured to perform, for example, but not limited to, radio frequency receiving and sending. The foregoing components may be disposed on chips independent of each other, or at least some or all of the foregoing components may be disposed on a same chip. For example, the processor may be further divided into an analog baseband processor and a digital baseband processor. The analog baseband processor and the transceiver may be integrated on a same chip, and the digital baseband processor may be disposed on an independent chip. With continuous development of integrated circuit technologies, an increasing quantity of components can be integrated into a same chip. For example, the digital baseband processor and a plurality of application processors (for example, but not limited to, a graphics processing unit and a multimedia processor) may be integrated into a same chip. Such a chip may be referred to as a system on chip (system on chip). Whether the components are disposed on different chips or integrated into one or more chips usually depends on a specific product design requirement. Specific implementation forms of the foregoing components are not limited in the embodiments of this application.

According to a fourth aspect, an embodiment of this application further provides a network device. The network device may be an apparatus in a terminal device, or an apparatus that can be used together with the terminal device. The network device has some or all of the functions of the terminal device in the method example in the second aspect. For example, the functions of the network device may have functions of implementing some or all of the embodiments of this application, or may have a function of implementing any embodiment of this application. The function may be implemented by hardware, or may be implemented by hardware executing corresponding software. The hardware or software includes one or more units or modules corresponding to the foregoing functions.

In a possible design, a structure of the network device may include a processing unit and a transceiver unit. The processing unit is configured to support the network device in performing a corresponding function in the method provided in the second aspect. The transceiver unit is configured to support communication between the network device and another device, and the another device may be the terminal device. The network device may further include a storage unit. The storage unit is configured to couple to the processing unit and the transceiver unit, and stores program instructions and data that are necessary for the network device.

In an implementation, the network device includes a transceiver unit and a processing unit.

The transceiver unit is configured to receive a first band combination set from the terminal device. The first band combination set includes a first band combination and a second band combination, the first band combination is a fallback band combination that has a same capability as the second band combination, and the first band combination and the second band combination correspond to different radio access technology types.

The processing unit is configured to determine, based on the first band combination set, a second band combination set supported by the terminal device.

That the processing unit determines, based on the first band combination set, a second band combination set supported by the terminal device is specifically: The processing unit adds a third band combination to the first band combination set, to obtain the second band combination set.

In an implementation, the network device includes a processor and a transceiver.

The transceiver is configured to receive a first band combination set from the terminal device. The first band combination set includes a first band combination and a second band combination, the first band combination is a fallback band combination that has a same capability as the second band combination, and the first band combination and the second band combination correspond to different radio access technology types.

The processor is configured to determine, based on the first band combination set, a second band combination set supported by the terminal device.

In a specific implementation process, the processor may be configured to perform, for example, but not limited to, baseband related processing; and the transceiver may be configured to perform, for example, but not limited to, radio frequency receiving and sending. The foregoing components may be disposed on chips independent of each other, or at least some or all of the foregoing components may be disposed on a same chip. For example, the processor may be further divided into an analog baseband processor and a digital baseband processor. The analog baseband processor and the transceiver may be integrated on a same chip, and the digital baseband processor may be disposed on an independent chip. With continuous development of integrated circuit technologies, an increasing quantity of components can be integrated into a same chip. For example, the digital baseband processor and a plurality of application processors (for example, but not limited to, a graphics processing unit and a multimedia processor) may be integrated into a same chip. Such a chip may be referred to as a system on chip (system on chip). Whether the components are disposed on different chips or integrated into one or more chips usually depends on a specific product design requirement. Specific implementation forms of the foregoing components are not limited in the embodiments of this application.

According to a fifth aspect, this application provides a chip system, and the chip system includes a processor and an interface. The chip system may be deployed in a terminal device. The processor is configured to implement the method in the first aspect through the interface. In a possible design, the chip system further includes a memory. The memory is configured to store program instructions and data that are necessary for the terminal device. The chip system may include a chip, or may include a chip and another discrete component.

According to a sixth aspect, this application provides a chip system, and the chip system includes a processor and an interface. The chip system may be deployed in a network device. The processor is configured to implement the method in the second aspect through the interface. In a possible design, the chip system further includes a memory. The memory is configured to store program instructions and data that are necessary for the network device. The chip system may include a chip, or may include a chip and another discrete component.

According to a seventh aspect, an embodiment of this application provides a computer-readable storage medium, configured to store computer software instructions used by the foregoing terminal device. The computer software instructions include a program used to perform the method in the first aspect.

According to an eighth aspect, an embodiment of this application provides a computer-readable storage medium, configured to store computer software instructions used by the foregoing network device. The computer software instructions include a program used to perform the method in the second aspect.

According to a ninth aspect, an embodiment of this application provides a computer program product including instructions. When the instructions are run on a computer, the computer is enabled to perform the method in the first aspect or the second aspect.

According to a tenth aspect, an embodiment of this application provides a system for reporting band information. The system for reporting band information includes a network device and a terminal device. The terminal device is configured to: determine a first band combination set to be sent by the terminal device, where the first band combination set includes a first band combination and a second band combination, the first band combination is a fallback band combination that has a same capability as the second band combination, and the first band combination and the second band combination correspond to different radio access technology types; and send the first band combination set to the network device. The network device is configured to: receive the first band combination set from the terminal device, where the first band combination set includes the first band combination and the second band combination, the first band combination is a fallback band combination that has a same capability as the second band combination, and the first band combination and the second band combination correspond to different radio access technology types; and determine, based on the first band combination set, a second band combination set supported by the terminal device.

BRIEF DESCRIPTION OF THE DRAWINGS

FIG. 3 is a schematic diagram of a second band combination set;

DETAILED DESCRIPTION OF ILLUSTRATIVE EMBODIMENTS

The following further describes in detail embodiments of this application with reference to the accompanying drawings.

Figure 1:
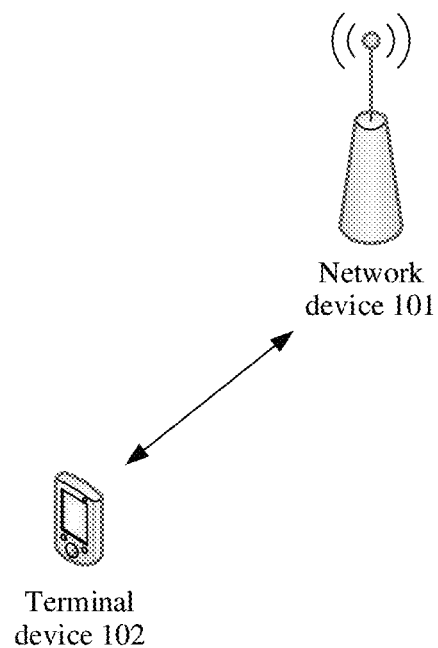
FIG. 1 is a schematic structural diagram of a communications system.

FIG. 1 is a schematic structural diagram of a communications system. The communications system shown in FIG. 1 includes at least one network device and one terminal device.

Figure 2:
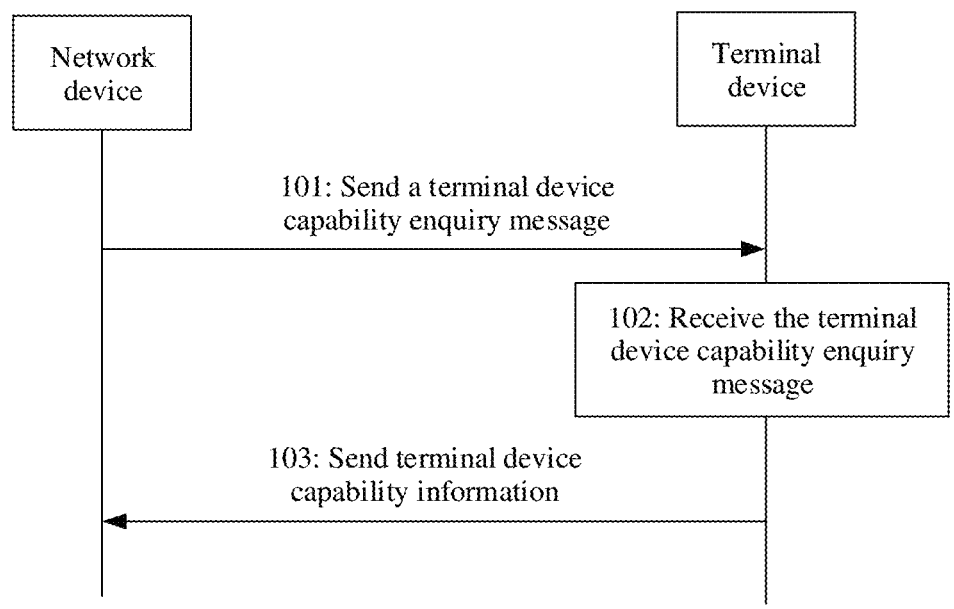
FIG. 2 is a schematic flowchart of a method for reporting capability information.

FIG. 2 is a schematic flowchart of a method for reporting capability information. The method for reporting capability information includes the following steps.

101: A network device may send a terminal device capability enquiry message to a terminal device, where the terminal device capability enquiry message includes RAT type indications of some radio access technologies (radio access technology, RAT) that need to be requested.

102: The terminal device receives the terminal device capability enquiry message.

103: The terminal device sends terminal device capability information to the network device, where the terminal device capability information includes related terminal device capability information in these radio access technologies, and the related capability information includes band combination (band combination, BC) information.

To reduce a processing load of the network device, for the band combination information carried in the terminal device capability information, the terminal device may use the method for reporting band combination information provided in this application.

The technical solutions of this application may be further applied to a standalone communications system, for example, including a new access network device deployed in a future network, or may be applied to various non-standalone communications systems.

For example, the technical solutions of this application may be applied to a fifth generation (5th generation, 5G) system, which may also be referred to as a new radio (new radio, NR) system, a sixth generation (6th generation, 6G) system, or another future communications system, or may be applied to a device-to-device (device to device, D2D) system, a machine-to-machine (machine to machine, M2M) system, a long term evolution (long term evolution, LTE) system, a multi-radio dual connectivity (Multi-RAT Dual Connectivity, MR-DC), and the like.

MR-DC may include a new radio-evolved universal mobile telecommunications system dual connectivity (NR-EUTRAN dual connection, NE-DC), an evolved universal mobile telecommunications system-new radio dual connectivity (EUTRAN-NR dual connection, EN-DC), a next generation evolved universal mobile telecommunications system-new radio dual connectivity (Next Generation EUTRAN-NR dual connection, NGEN-DC), and the like. DC represents dual connectivity. E represents an evolved universal mobile telecommunications system (universal mobile telecommunications system, UMTS) terrestrial radio access (evolved-UMTS terrestrial radio access, E-UTRA), namely, a fourth generation (4th generation, 4G) radio access network, namely, a long term evolution (long term evolution, LTE) radio access network. N represents NR, namely, 5G NR. NG represents a next generation core (next generation core), namely, a 5G core.

NE-DC is dual connectivity between 5G NR and 4G, and a 5G NR base station is a master node. NG EN-DC is dual connectivity between 4G and 5G NR in the 5G core. A 4G base station (LTE base station, such as an eNB) is a master node. EN-DC refers to dual connectivity between a 4G radio access network and 5G NR. In an EN-DC scenario, UE is connected to both an LTE base station (for example, an eNB) and an NR base station (for example, a gNB), and is served by the two base stations. The LTE base station is a master node (master node, MN).

In the embodiments of this application, the network device may be a device that has a wireless transceiver function or a chip that can be disposed in the device. The network device includes but is not limited to an evolved NodeB (evolved node B, eNB), a radio network controller (radio network controller, RNC), a NodeB (Node B, NB), a network device controller (base station controller, BSC), a network device transceiver station (base transceiver station, BTS), a home network device (for example, a home evolved Node B, or a home Node B, HNB), a baseband unit (baseband unit, BBU), an access point (access point, AP) in a wireless fidelity (wireless fidelity, WIFI) system, a wireless relay node, a wireless backhaul node, a transmission point (transmission and reception point, TRP or transmission point, TP), and the like. Alternatively, the network device may be a device used in a 5G system, a 6G system, or even a 7G system, for example, a gNB or a transmission point (TRP or TP) in an NR system, or one antenna panel or a group of antenna panels (including a plurality of antenna panels) of the network device in the 5G system. Alternatively, the network device may be a network node that constitutes a gNB or a transmission point, for example, a baseband unit (BBU), or a distributed unit (DU, distributed unit), or a pico network device (Picocell), or a femto network device (Femtocell), or a road side unit (road side unit, RSU) in vehicle-to-everything (vehicle to everything, V2X) or in an intelligent driving scenario.

In the embodiments of this application, the terminal device may include but is not limited to user equipment (user equipment, UE), an access terminal, a subscriber unit, a subscriber station, a mobile station, a mobile console, a remote station, a remote terminal, a mobile device, a user terminal, a user agent, a user apparatus, or the like. For another example, the terminal device may be a mobile phone (mobile phone), a tablet computer (Pad), a computer with a wireless transceiver function, a virtual reality (virtual reality, VR) terminal device, an augmented reality (augmented reality, AR) terminal device, a wireless terminal in industrial control (industrial control), a wireless terminal in self-driving (self driving), a wireless terminal in remote medical (remote medical), a wireless terminal in smart grid (smart grid), a wireless terminal in transportation safety (transportation safety), a wireless terminal in a smart city (smart city), a wireless terminal in a smart home (smart home), or a wireless terminal or an RSU of a wireless terminal type in V2X vehicle-to-everything.

To facilitate understanding of the embodiments disclosed in this application, some concepts in the embodiments of this application are first described. These concepts include but are not limited to the following content.

Terminal device capability enquiry message: The terminal device capability enquiry message is used to request the terminal device to send one or more radio access capabilities of the terminal device in one or more RATs. RAT types indicated by RAT type indications in the terminal device capability enquiry message may include a plurality of RAT types, for example, 4G, 5G, future 6G, or another standard. The RAT types indicated by the RAT type indications may further include a plurality of RATs in which the terminal device simultaneously operates, for example, EN-DC and NE-DC.

The terminal device capability enquiry message may further include a capability filter parameter, and the capability filter parameter is used to indicate a range of requested terminal device capability information, a parameter of requested terminal device capability information, or the like. The capability filter parameter information may include band information and the like. The band information is used to indicate to request a band combination supported by the terminal device, and may indicate to request all band combinations or a band combination in a specified range.

First band combination set and second band combination set: The second band combination set is a set including the band combination that is determined by the terminal device based on the terminal device capability enquiry message and that is supported by the terminal device. The second band combination set may be all the band combinations or the band combination in the specified range. This is not limited in the embodiments of this application. The first band combination set is a set including a to-be-sent band combination determined by the terminal device. In other words, the band combination in the first band combination set is also a band combination supported by the terminal device. However, the first band combination set is a subset of the second band combination set. In this way, a quantity of band combinations that are explicitly reported can be reduced, and therefore overheads required for reporting can be reduced.

Band combination: The band combination means that the terminal device may operate on one or more bands. In other words, one band combination may correspond to one or more bands, for example, BC1 (band1, band2). A set of band combinations is a set including a plurality of band combinations, for example, a band combination set {BC1 (band1, band2); BC2 (band3, band4)}.

Fallback band combination: The fallback band combination is a band combination obtained by releasing at least one secondary cell, or an uplink configuration of at least one secondary cell, or a secondary cell group from a band combination. The secondary cell may be a secondary carrier, and the secondary cell group may be carriers corresponding to secondary nodes.

For example, Table 1 shows band combinations obtained by releasing at least one secondary cell, or an uplink configuration of at least one secondary cell, or a secondary cell group from some large band combinations. It should be noted that L_band represents an LTE band, and N_band represents an NR band.

TABLE 1

| Large band combination (or band combination that can be fallen back, or band combination that is fallen back) | Band combination obtained after fallback |
|---|---|
| NR SA BC1 (N_band1, N_band2) | NR SA BC2 (N_band1) |
|  | NR_SA_BC3 (N_band2) |
| NE-DC BC1 (L_band1, N_band3) | NR SA BC4 (N_band3) |
| NE-DC BC2 (L_band1, L_band2, N_band4, N_band5) | NE-DC BC3 (L_band2, N_band4, N_band5) |

TABLE 1-continued

| Large band combination (or band combination that can be fallen back, or band combination that is fallen back) | Band combination obtained after fallback |
|---|---|
| | NE-DC BC4 (L_band1, N_band4, N_band5) |
| | NR SA BC5 (N_band4, N_band5) |
| | NR SA BC6 (N_band4) |
| | NR SA BC7 (N_band5) |

In Table 1, any band in NR SA BC1 (N_band1, N_band2) may be used as a secondary cell. Therefore, a band combination obtained by releasing one secondary cell or an uplink configuration of one secondary cell from NR SA BC1 (N_band1, N_band2) is NR SA BC2 (N_band1) and NR SA BC3 (N_band2).

In Table 1, in NE-DC BC1 (L_band1, N_band3), N_band3 is a cell of a master node, and L_band1 is a cell of a secondary node. The master node cannot be released, and only the secondary node can be released. Therefore, a band combination obtained by releasing a secondary cell group is NR SA BC3 (N_band3).

In Table 1, in NE-DC BC2 (L_band1, L_band2, N_band4, N_band5), N_band4 and N_band5 are cells of a master base station, each N_band may be used as a secondary cell of a master node, and L_band is a cell of a secondary node (namely, a secondary cell). Therefore, a band combination obtained by releasing one secondary cell, or an uplink configuration of one secondary cell, or a secondary cell group from NE-DC BC3 (L_band1, L_band2, N_band4, N_band5) is NE-DC BC3 (L_band2, N_band4, N_band5), NE-DC BC4 (L_band1, N_band4, N_band5), NR SA BC5 (N_band4), NR SA BC6 (N_band5), and NR SA BC7 (N_band4, N_band5).

Band combinations corresponding to different RAT types may be included in a corresponding RAT container (container). For example, a band combination included in an NR container is a band combination corresponding to NR. For example, the NR container includes a new radio standalone band combination (New radio standalone band combination, NR SA BC) and a new radio dual connectivity band combination (New radio dual connection band combination, NR DC BC). A band combination included in an MR-DC container is a band combination corresponding to NE-DC and a band combination corresponding to EN-DC. For example, the MR-DC container includes an EN-DC BC, an NGEN-DC, and an NE-DC BC. A band combination included in an EUTRA container is a band combination corresponding to LTE. For example, the EUTRA container includes an LTE BC.

For example, for the band combinations shown in Table 1, as shown in FIG. 3, NR SA BC1 (N_band1, N_band2), NR SA BC2 (N_band1), NR SA BC3 (N_band2), NR SA BC4 (N_band3), NR SA BC5 (N_band4, N_band5), NR SA BC6 (N_band4), and NR SA BC7 (N_band5) are band combinations included in the NR container. NE-DC BC1 (L_band1, N_band3), NE-DC BC2 (L_band1, L_band2, N_band4, N_band5), NE-DC BC3 (L_band2, N_band4, N_band5), and NE-DC BC4 (L_band1, N_band4, N_band5) are band combinations included in the MR-DC.

To reduce overheads required for reporting the band information, currently, fallback band combinations with a same capability are not explicitly reported. A capability may include but is not limited to at least one of the following capability parameters: a packet data convergence protocol (Packet Data Convergence Protocol, PDCP) parameter of the terminal, a radio link control (Radio Link Control, RLC) parameter of the terminal, a medium access control (medium access control, MAC) parameter of the terminal, a physical (Physical, PHY) parameter of the terminal, a radio frequency (Radio Frequency, RF) parameter of the terminal, a measurement (Radio Measurement Management, RRM) parameter of the terminal, or the like. The same capability means that the foregoing capability parameter of a band combination is the same as that of a band combination obtained after the band combination is fallen back. This embodiment of this application is described by using an example in which a band combination obtained after fallback has a same capability as a band combination obtained before fallback. If the band combination obtained after fallback has different capabilities from the band combination obtained before fallback, the band combination obtained after fallback also needs to be explicitly reported.

Figure 4:
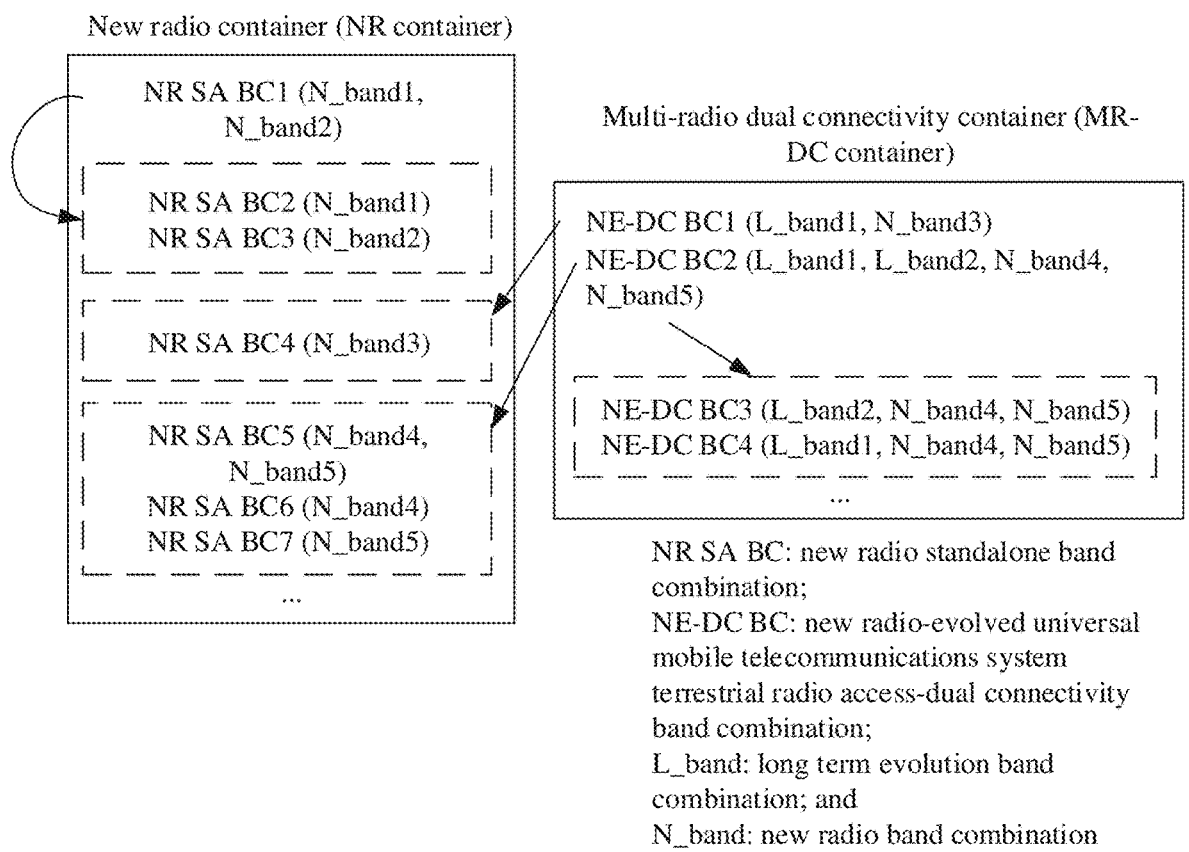
FIG. 4 is a schematic diagram 1 of reporting band information.

For example, NR SA BC2 (N_band1) and NR SA BC3 (N_band2) are band combinations after NR SA BC1 (N_band1, N_band2) is fallen back, NR SA BC4 (N_band3) is a band combination after NE-DC BC1 (L_band1, N_band3) is fallen back, and NE-DC BC3 (L_band2, N_band4, N_band5), NE-DC BC4 (L_band1, N_band4, N_band5), NR SA BC5 (N_band4, N_band5), NR SA BC6 (N_band4), and NR SA BC7 (N_band5) are band combinations after NE-DC BC2 (L_band1, L_band2, N_band4, N_band5) is fallen back. It is assumed that these band combinations obtained after fallback have a same capability, for example, a same capability parameter, as the band combinations that are fallen back. In this case, these band combinations obtained after fallback are not reported according to the current method for reporting band information. As shown in FIG. 4, an NR container reported by the terminal device does not include band combinations in dashed-line boxes, and an MR-DC container reported by the terminal device does not include band combinations in a dashed-line box. Further, a band combination set from the terminal device may be shown in FIG. 5. Overheads of reporting band combination information in FIG. 5 are far less than those in FIG. 3.

Figure 5:
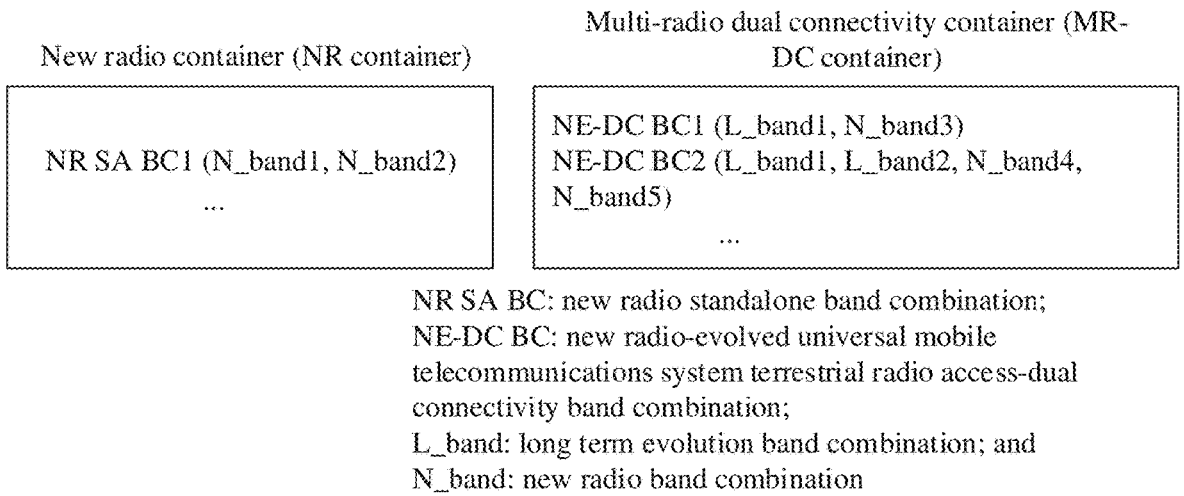
FIG. 5 is a schematic diagram 2 of reporting band information.

However, when the network device receives the band combination set shown in FIG. 5, and further determines the band combination supported by the terminal device shown in FIG. 3, to obtain all band combinations in the NR container, the network device needs to consider both a band combination that is obtained after a band combination in the NR container is fallen back and that has a same capability as the band combination, and a band combination in the NR container that is obtained after a band combination in the MR-DC container is fallen back and that has a same capability as the band combination. For example, the network device needs to consider a band combination that is in the MR-DC container and that is obtained after NE-DC BC1 (L_band1, N_band3) is fallen back: NR SA BC4 (N_band3), which is added to the NR container, and band combinations that are obtained after NE-DC BC2 (L_band1, L_band2, N_band4, N_band5) is fallen back: (NR SA BC5 (N_band4, N_band5), NR SA BC6 (N_band4), and NR SA BC7 (N_band5), which are added to the NR container. Further, the network device may obtain the band combination supported by the terminal device shown in FIG. 3.

It can be learned that the network device needs to refer to band combinations corresponding to a plurality of RAT types, to obtain all band combinations corresponding to one RAT type. This greatly increases an operating load of the network device.

To resolve this problem, this application provides a method for reporting band information, to reduce overheads required for reporting band information and reduce an operating load of the network device.

Figure 6:
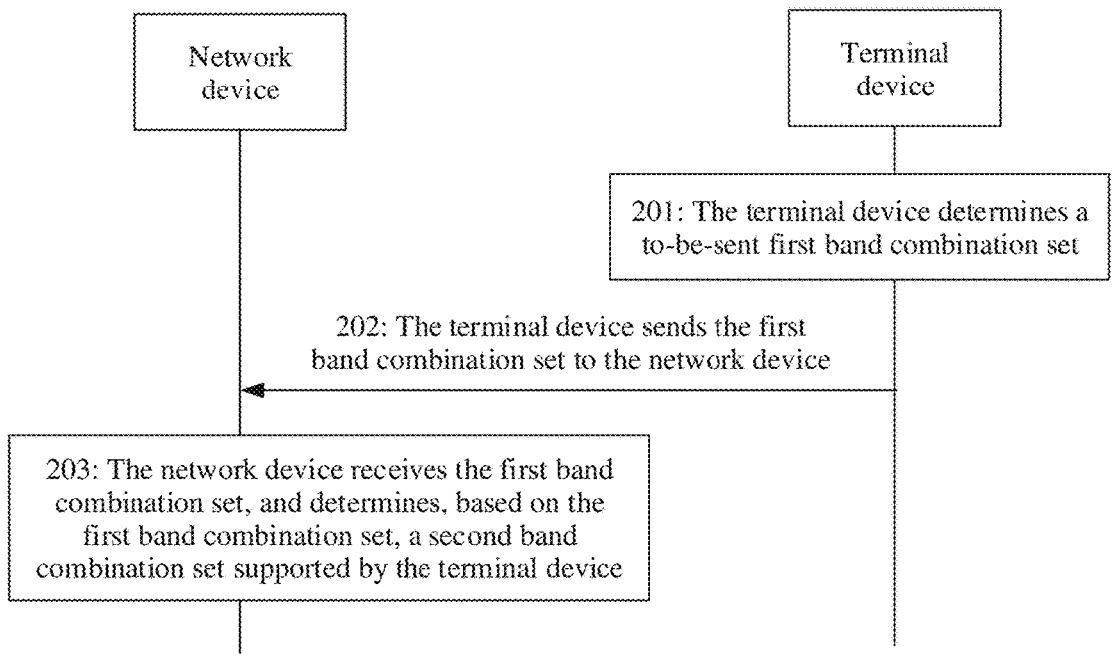
FIG. 6 is a schematic diagram of a method for reporting band information.

FIG. 6 is a schematic flowchart of a method for reporting band information according to an embodiment of this application. As shown in FIG. 6, the method for reporting band information includes the following steps.

201: A terminal device determines a to-be-sent first band combination set, where the first band combination set includes a first band combination and a second band combination, the first band combination is a fallback band combination that has a same capability as the second band combination, and the first band combination and the second band combination correspond to different radio access technology types.

202: The terminal device sends the first band combination set to a network device.

203: The network device receives the first band combination set, and determines, based on the first band combination set, a second band combination set supported by the terminal device.

In this embodiment of this application, the terminal device determines, based on a band combination set supported by the terminal device, namely, the second band combination set, the first band combination set to be sent by the terminal device.

In an optional implementation, the first band combination set is a subset of the second band combination set, and the second band combination set further includes a fallback band combination that has a same capability as each band combination in the first band combination set.

A protocol or signaling may be used to predefine or configure that the terminal device supports, by default, the fallback band combination that has a same capability as each band combination in the first band combination set. In other words, the second band combination set includes both each band combination in the first band combination set, and the fallback band combination that has a same capability as each band combination in the first band combination set. In an optional implementation, in this embodiment of this application, the terminal device does not need to not report all fallback band combinations or explicitly report all fallback band combinations, but may further report some of fallback band combinations in addition to a large band combination such as the second band combination. The first band combination set may include a first band combination and a second band combination, the first band combination is a fallback band combination that has a same capability as the second band combination, and the first band combination and the second band combination correspond to different radio access technology types.

For example, in Table 1, a large BC such as NR SA BC1 (N_band1, N_band2), NE-DC BC1 (L_band1, N_band3), or NE-DC BC2 (L_band1, L_band2, N_band4, N_band5) is the second band combination. A band combination obtained after a large BC corresponding to another radio access technology type such as NR SA BC4 (N_band3) or NR SA BC5 (N_band4, N_band5) is fallen back is the first band combination.

It is assumed that the second band combination set includes all the band combinations in Table 1. As shown in FIG. 3, in the second band combination set, an NR container includes NR SA BC1 (N_band1, N_band2), NR SA BC2 (N_band1), NR SA BC3 (N_band2), NR SA BC4 (N_band3), NR SA BC5 (N_band4, N_band5), NR SA BC6 (N_band4), and NR SA BC7 (N_band5); and an MR-DC container includes NE-DC BC1 (L_band1, N_band3), NE-DC BC2 (L_band1, L_band2, N_band4, N_band5), NE-DC BC3 (L_band2, N_band4, N_band5), and NE-DC BC4 (L_band1, N_band4, N_band5). In this case, according to the method for reporting band information in this embodiment of this application, because NR SA BC4 (N_band3) is a fallback band combination that has a same capability as NE-DC BC1 (L_band1, N_band3), but NR SA BC4 (N_band3) and NE-DC BC1 (L_band1, N_band3) correspond to different radio access technology types, NR SA BC4 (N_band3) is the first band combination. Similarly, NR SA BC5 (N_band4, N_band5) is the first band combination.

Figure 7:
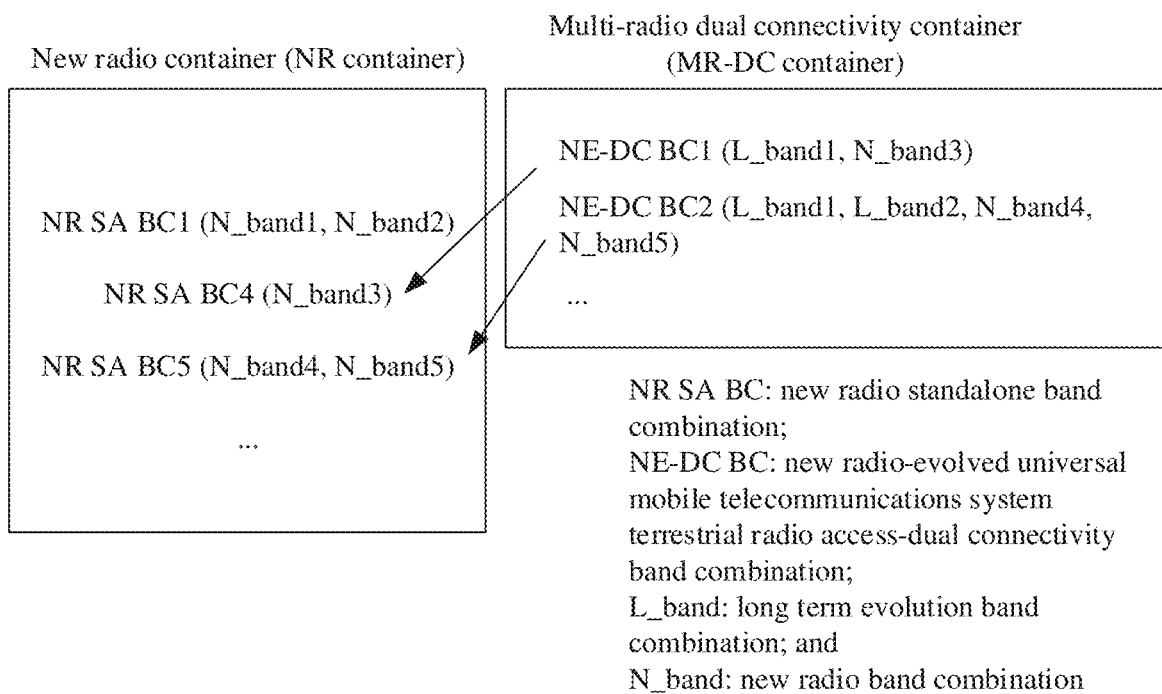
FIG. 7 is a schematic diagram of a first band combination set according to an embodiment of this application.

Therefore, as shown in FIG. 7, in the first band combination set, the NR container includes NR SA BC1 (N_band1, N_band2), NR SA BC4 (N_band3), and NR SA BC5 (N_band4, N_band5), and the MR-DC container includes NE-DC BC1 (L_band1, N_band3) and NE-DC BC2 (L_band1, L_band2, N_band4, N_band5).

Correspondingly, that the network device determines, based on the first band combination set, a second band combination set supported by the terminal device may be: The network device adds, to the first band combination set, the fallback band combination that has a same capability as each band combination in the first band combination, to obtain the second band combination set. It can be learned that in this embodiment of this application, a quantity of band combinations in the first band combination set is less than a quantity of band combinations in the second band combination set. Therefore, compared with a manner of reporting or sending all the band combinations in the second band combination set, the method provided in this embodiment of this application can reduce overheads required for reporting band information. In addition, in this embodiment of this application, the terminal device also explicitly reports a band combination of a type of the first band combination to the network device, so that when determining a to-be-added fallback band combination, the network device only needs to consider a band combination obtained after a large band combination corresponding to a same RAT type is fallen back.

For example, as shown in FIG. 7, the network device only needs to consider the band combinations in the NR container, for example, band combinations obtained after NR SA BC1 (N_band1, N_band2) and NR SA BC5 (N_band4, N_band5) are fallen back, to obtain the band combinations in the NR container in FIG. 3. Because reported band combinations include NR SA BC2 (N_band3) and NR SA BC5 (N_band4, N_band5), the network device does not need to consider band combinations obtained after band combinations: NE-DC BC1 (L_band1, N_band3) and NE-DC BC2 (L_band1, N_band4, N_band5) corresponding to MR-DC are fallen back. In other words, when determining a band combination corresponding to NR, the network device does not need to refer to a band combination corresponding to MR-DC, to help reduce a processing load of the network device.

Optionally, the first band combination set does not include a third band combination, the third band combination is a fallback band combination that has a same capability as the second band combination, and the third band combination and the second band combination correspond to a same radio access technology type.

It should be understood that the first band combination is a fallback band combination that has a same capability as the second band combination, and the first band combination and the second band combination correspond to different radio access technology types. In this case, the first band combination is a fallback band combination obtained by releasing a secondary cell group (SCG) from the second band combination (for example, an LTE band combination is obtained after an EN-DC band combination is fallen back, or an NR band combination obtained after an NE-DC band combination is fallen back). The third band combination is a fallback band combination that has a same capability as the second band combination, and the third band combination and the second band combination correspond to a same radio access technology type. In this case, the third band combination may be a fallback band combination obtained by releasing a secondary cell group (SCG) from the second band combination (for example, an NR band combination is obtained after an NR-DC band combination is fallen back), or may be a fallback band combination obtained by releasing at least one secondary cell (SCell) from the second band combination (for example, an NR band combination is obtained after an NR carrier aggregation (Carrier aggregation, CA) band combination is fallen back), or may be a fallback band combination obtained by releasing an uplink configuration of at least one secondary cell from the second band combination (for example, an NR band combination obtained after an NR CA band combination is fallen back). Therefore, a large band combination obtained before fallback and a band combination obtained after fallback can correspond to different radio access technology types only by releasing the SCG. However, there may be a case in which the large band combination obtained before fallback and the band combination obtained after fallback correspond to a same radio access technology type by releasing the SCG.

It should be noted that, in an optional implementation, the NR-DC band combination may alternatively be the NR CA band combination. The fallback band combination obtained by releasing the secondary cell group (SCG) is the same as the fallback band combination obtained by releasing the at least one secondary cell (SCell), or the fallback band combination obtained by releasing the secondary cell group (SCG) is the same as the fallback band combination obtained by releasing the uplink configuration of the at least one secondary cell. In other words, the NR band combination obtained after the NR-DC band combination is fallen back is equivalent to the NR band combination obtained after the NR CA band combination is fallen back. Therefore, it may be considered that the NR band combination is a fallback band combination obtained by releasing at least one secondary cell (SCell) or an uplink configuration of at least one secondary cell from a large NR band combination, and the NR band combination includes at least one of the NR-DC band combination, the NR CA band combination, and an NR single-carrier band combination. In this case, the third band combination may be the fallback band combination obtained by releasing the at least one secondary cell (SCell) or the uplink configuration of the at least one secondary cell from the second band combination.

In an optional implementation, that the terminal device determines the first band combination set based on the second band combination set may include: The terminal device removes the third band combination from the second band combination set, to obtain the first band combination set. In other words, the terminal device removes the third band combination from the second band combination set, and retains the first band combination, to obtain the first band combination set. It should be noted that the third band combination may be a fallback band combination obtained by releasing at least one secondary cell (SCell) or an uplink configuration of at least one secondary cell from the second band combination, or the third band combination may not be a fallback band combination obtained by releasing a secondary cell group (SCG) from the second band combination.

For example, in FIG. 3, NR SA BC2 (N_band1) and NR SA BC3 (N_band2) are fallback band combinations that have a same capability as NR SA BC1 (N_band1, N_band2), and correspond to a same radio access technology type: NR as NR SA BC1 (N_band1, N_band2). Therefore, NR SA BC2 (N_band1) and NR SA BC3 (N_band2) are third band combinations, and the first band combination set may not include NR SA BC2 (N_band1) and NR SA BC3 (N_band2). For another example, NR SA BC6 (N_band4) and NR SA BC7 (N_band5) are fallback band combinations that have a same capability as NR SA BC5 (N_band4, N_band5), and correspond to a same radio access technology type: NR as NR SA BC5 (N_band4, N_band5). Therefore, NR SA BC6 (N_band4) and NR SA BC7 (N_band5) are third band combinations, and the first band combination set may not include NR SA BC6 (N_band4) and NR SA BC7 (N_band5).

In another optional implementation, that the terminal device determines the first band combination set based on the second band combination set may include: The terminal device removes a fourth band combination from the second band combination set, and adds the first band combination to the second band combination set, to obtain the first band combination set. The fourth band combination is a fallback band combination that has a same capability as the second band combination. Compared with a manner in which the fourth band combination is removed from the second band combination set to obtain and report the first band combination set, this implementation requires fewer modifications. Especially, in some scenarios, the terminal device may remove the fourth band combination from the second band combination set to obtain and report the first band combination set, or in some other scenarios, the terminal device may use the method for reporting band information described in this embodiment of this application. In this implementation, complexity of change processing performed by the terminal device can be reduced. In other words, an operation difference between the two reporting manners used by the terminal device is whether the first band combination is added.

For example, in FIG. 3, NR SA BC2 (N_band1) and NR SA BC3 (N_band2) are fallback band combinations that have a same capability as NR SA BC1 (N_band1, N_band2), NR SA BC4 (N_band3) is a fallback band combination that has a same capability as NE-DC BC1 (L_band1, N_band3), NR SA BC5 (N_band4, N_band5), NR SA BC6 (N_band4), and NR-SA BC7 (N_band5) are fallback band combinations that have a same capability as NE-DC BC2 (L_band1, L_band2, N_band4, N_band5). Therefore, NR SA BC2 (N_band1), NR SA BC3 (N_band2), NR SA BC4 (N_band3), NR SA BC5 (N_band4, N_band5), NR SA BC6 (N_band4), NR SA BC7 (N_band5), and the like are all fourth band combinations. The terminal device may remove these fourth band combinations from the second band combination set, and add the first band combination to the second band combination set. NR SA BC4 (N_band3) and NR SA BC5 (N_band4, N_band5) are first band combinations. Therefore, the terminal device may add these first band combinations to the second band combination set to obtain the first band combination set shown in FIG. 7.

The foregoing two implementations of determining the first band combination set may be selected based on an operating scenario of the terminal device. This is not limited in this embodiment of this application.

Figure 12:
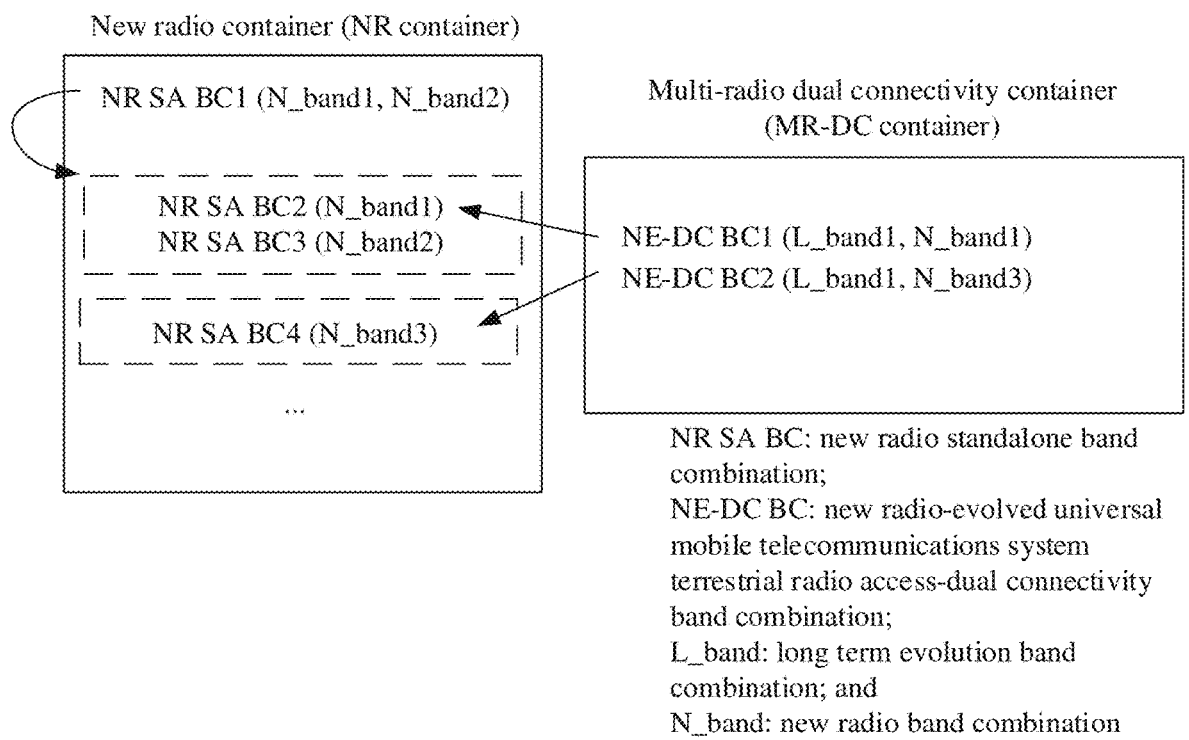
FIG. 12 is a schematic diagram 3 of reporting band information.

In some embodiments, the third band combination further includes a fifth band combination, and the first band combination does not include the fifth band combination. The third band combination is a fallback band combination that has a same capability as the second band combination, and the third band combination and the second band combination correspond to a same radio access technology type. For example, as shown in FIG. 12, NR SA BC1 (N_band1, N_band2) in the NR container is the second band combination, and NR SA BC2 (N_band1) and NR SA BC3 (N_band2) can be obtained after NR SA BC1 (N_band1, N_band2) is fallen back. The two band combinations are third band combinations. The fifth band combination is not only a band combination obtained after a large band combination of a same RAT type is fallen back, but also a band combination obtained after a large band combination of a different RAT type is fallen back. For example, as shown in FIG. 12, the NR container includes NR SA BC1 (N_band1, N_band2), NR SA BC2 (N_band1), NR SA BC3 (N_band2), and NR SA BC4 (N_band3), and the MR-DC container includes NE-DC BC1 (L_band1, N_band1) and NE-DC BC2 (L_band1, N_band3). NR SA BC2 (N_band1) is not only a fallback band combination that has a same capability as NR SA BC1 (N_band1, N_band2) of a same RAT type, but also a fallback band combination that has a same capability as NE-DC BC1 (L_band1, N_band1) of a different RAT type. Therefore, NR SA BC2 (N_band1) is the fifth band combination. Although the fifth band combination is a fallback band combination that has a same capability as a large band combination of a different RAT type, according to the descriptions in the foregoing embodiment, the fifth band combination needs to be explicitly reported to the network device. However, because the fifth band combination also belongs to the third band combination, and may be obtained after a large band combination of a same RAT type is fallen back, the fifth band combination does not need to be explicitly reported to the network device. For example, as shown in FIG. 12, NR SA BC2 (N_band1) is the fifth band combination, and may be obtained after NE-DC BC1 (L_band1, N_band1) in the MR-DC container is fallen back, or may be obtained after NR SA BC1 (N_band1, N_band2) in the NR container is fallen back. NE-DC BC1 (L_band1, N_band1) is a large band combination in the MR-DC container, and NR SA BC1 (N_band1, N_band2) is a large band combination in the NR container.

In this case, the terminal device may not report NR SA BC2 (N_band1) to the network device. In this embodiment of this application, if a band combination belongs to both the third band combination and a band combination obtained after a large band combination of a different RAT type is fallen back, the terminal device may not report the band combination. In other words, the first band combination set reported by the terminal device does not include the fifth band combination. Advantages of this manner are as follows: It can be ensured that when determining a to-be-added fallback band combination, the network device only needs to consider a band combination obtained after a large band combination corresponding to a same RAT type is fallen back, and overheads required for reporting performed by the terminal device can be reduced.

In an optional implementation, that the terminal device determines a to-be-sent first band combination set may specifically include: The terminal device removes the third band combination from the second band combination set to obtain the first band combination set. In other words, the terminal device removes the third band combination from the second band combination set, and retains the first band combination, to obtain the first band combination set. The third band combination includes a fifth band combination, the first band combination does not include the fifth band combination, and the first band combination set does not include the fifth band combination. It should be noted that the third band combination may be a fallback band combination obtained by releasing at least one secondary cell (SCell) or an uplink configuration of at least one secondary cell from the second band combination, or the third band combination may not be a fallback band combination obtained by releasing a secondary cell group (SCG) from the second band combination.

In another optional implementation, that the terminal device determines the first band combination set based on the second band combination set may include: The terminal device removes a fourth band combination from the second band combination set, and adds the first band combination to the second band combination set, to obtain the first band combination set. The fourth band combination is a fallback band combination that has a same capability as the second band combination. The fourth band combination includes a fifth band combination, the first band combination does not include the fifth band combination, and the first band combination set does not include the fifth band combination.

It may be understood that the terminal device may also report the fifth band combination to the network device. In other words, the first band combination reported by the terminal device includes the fifth band combination, and the third band combination does not include the fifth band combination. In other words, the first band combination set reported by the terminal device includes the fifth band combination. For example, as shown in FIG. 12, the terminal device may report NR SA BC2 (N_band1) to the network device. An advantage of this manner is that processing complexity of the terminal device can be reduced.

In an optional implementation, that the terminal device determines a to-be-sent first band combination set may specifically include: The terminal device removes the third band combination from the second band combination set to obtain the first band combination set. In other words, the terminal device removes the third band combination from the second band combination set, and retains the first band combination, to obtain the first band combination set. The third band combination does not include a fifth band combination, the first band combination includes the fifth band combination, and the first band combination set includes the fifth band combination.

In another optional implementation, that the terminal device determines the first band combination set based on the second band combination set may include: The terminal device removes a fourth band combination from the second band combination set, and adds the first band combination to the second band combination set, to obtain the first band combination set. The fourth band combination is a fallback band combination that has a same capability as the second band combination. The fourth band combination includes a fifth band combination, the first band combination includes the fifth band combination, and the first band combination set includes the fifth band combination.

An implementation of determining the first band combination set is not limited in this embodiment of this application.

In an optional implementation, when RATs indicated by RAT type indications in an enquiry message of the terminal device include NR and MR-DC, the first band combination is a new radio standalone (NR SA) band combination, and the second band combination includes a new radio-evolved universal mobile telecommunications system terrestrial radio access-dual connectivity (NE-DC) band combination.

In another optional implementation, when RATs indicated by RAT type indications in an enquiry message of the terminal device include EUTRA and MR-DC, the first band combination is an LTE band combination, and the second band combination includes an evolved universal mobile telecommunications system terrestrial radio access-new radio-dual connectivity (EN-DC) band combination. In other words, although NR and MR-DC are used as examples for description in FIG. 3 and FIG. 7, it is not limited that the method for reporting band information described in this embodiment of this application is used in a scenario in which a fallback band combination obtained after a band combination corresponding to EN-DC is fallen back is the LTE band combination.

In an optional implementation, a radio access technology type corresponding to the first band combination is new radio (NR), and a radio access technology type corresponding to the second band combination includes evolved universal mobile telecommunications system terrestrial radio access (EUTRA-NR).

In another optional implementation, a radio access technology type corresponding to the first band combination is EUTRA, and a radio access technology type corresponding to the second band combination includes evolved universal mobile telecommunications system terrestrial radio access (EUTRA-NR).

It can be learned that, when the terminal device adds a BC to the NR container in terminal device capability information (or determines a BC included in the NR container in the first band combination set), the terminal device may remove an NR BC obtained after at least one CC is removed from an NR SA BC (in other words, a band combination obtained after the NR SA BC is fallen back is still a band combination corresponding to NR), remove an NR BC obtained after an NR SCG is removed from an NR-DC BC (in other words, a band combination obtained after the NR SA BC is fallen back is still a band combination corresponding to NR), and retains an NR BC obtained after an LTE SCG is removed from an NE-DC BC.

Figure 8:
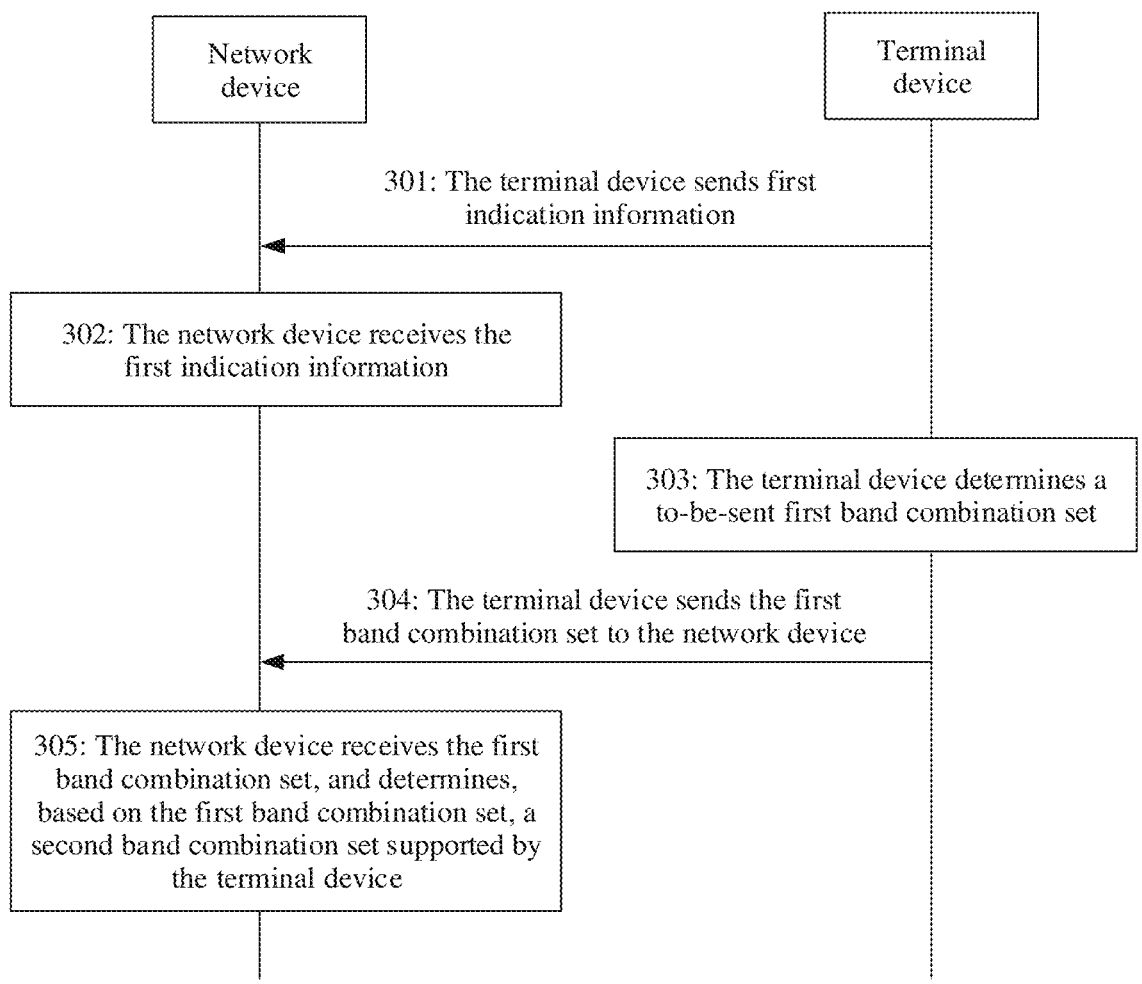
FIG. 8 is a schematic flowchart of another method for reporting band information according to an embodiment of this application.

FIG. 8 is a schematic flowchart of another method for reporting band information according to an embodiment of this application. Compared with the method for reporting band information shown in FIG. 6, the method for reporting band information in FIG. 8 further includes the following steps.

301: The terminal device sends first indication information, where the first indication information is used to indicate that a band combination set from the terminal device includes the first band combination.

302: The network device receives the first indication information.

In addition, steps 303 to 305 in FIG. 8 are similar to the steps 201 to 203 in FIG. 6, and details are not described herein again.

It can be learned that this implementation helps notify the network device that the network device can explicitly obtain the first band combination, without a need to determine, with reference to a band combination corresponding to a radio access technology type, a band combination corresponding to another radio access technology type. This reduces implementation complexity of the network device.

Optionally, the first indication information is used to indicate that a band combination information reporting rule used by the terminal device is that the first band combination set includes the first band combination and the second band combination, but does not include the third band combination. This implementation helps reduce implementation complexity of the network device and reduce overheads required for reporting a supported band combination by the terminal device.

Optionally, the band combination information reporting rule may include at least two of the following: the first band combination set includes the first band combination and the second band combination, but does not include the third band combination; the first band combination set includes the first band combination, the second band combination, and the third band combination; and the first band combination set includes the first band combination, but does not include the second band combination and the third band combination. In this case, the first indication information may be a plurality of optional values, and each optional value corresponds to one band combination information reporting rule. This helps the network device determine, according to a corresponding rule, a band combination supported by the terminal device.

In some embodiments, referring to the embodiment shown in FIG. 6, if the third band combination includes a fifth band combination, the terminal device may not report the fifth band combination, and the first band combination set reported by the terminal device does not include the fifth band combination. Optionally, the terminal device may report the fifth band combination, and the first band combination set reported by the terminal device includes the fifth band combination.

Figure 9:
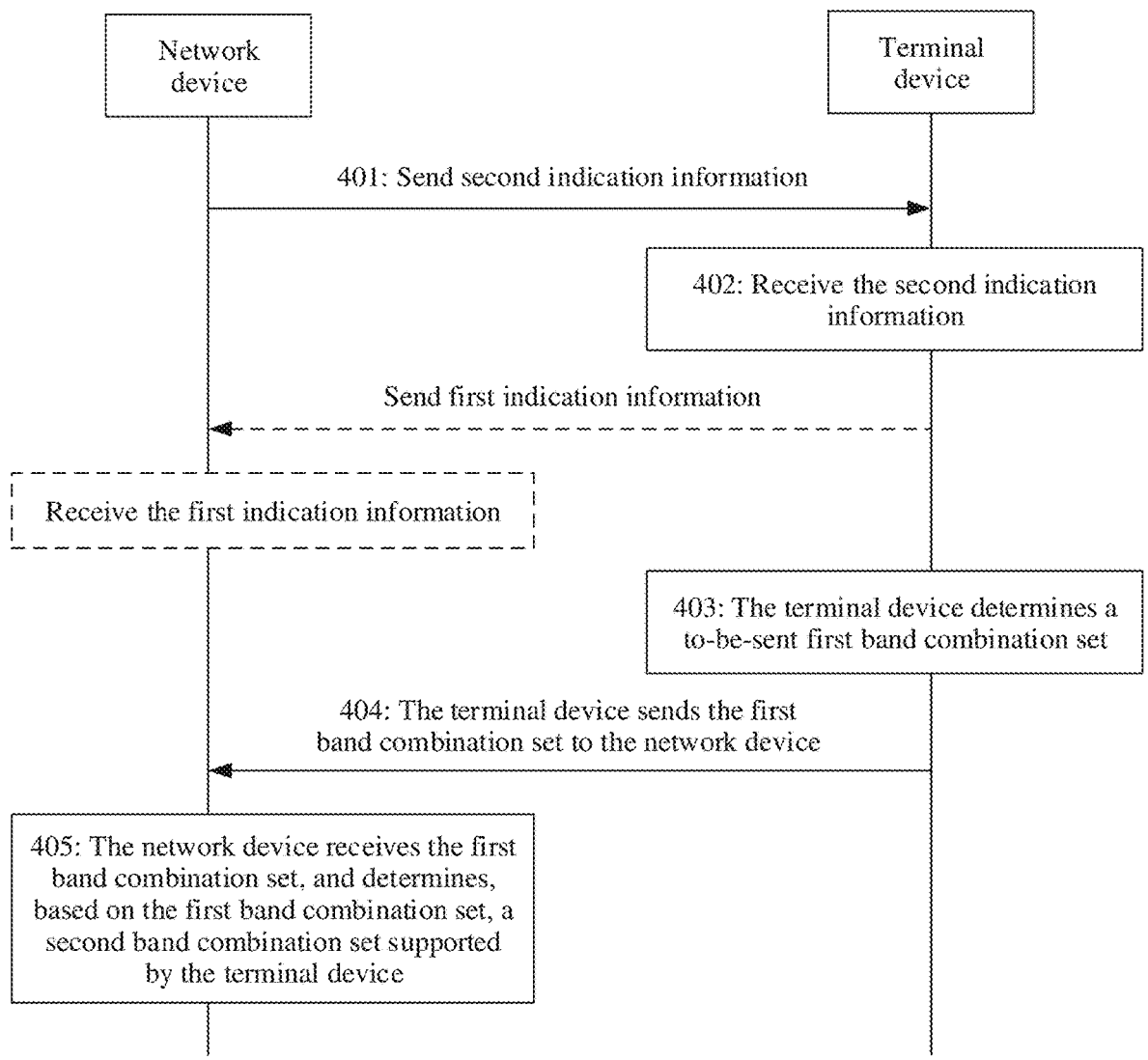
FIG. 9 is a schematic flowchart of still another method for reporting band information according to an embodiment of this application.

FIG. 9 is a schematic flowchart of another method for reporting band information according to an embodiment of this application. Compared with the method for reporting band information shown in FIG. 6 or FIG. 8, the method for reporting band information shown in FIG. 9 further includes the following steps.

401: The network device sends second indication information, where the second indication information is used to indicate that the band combination set from the terminal device is allowed to include the first band combination.

402: The terminal device receives the second indication information.

In addition, steps 403 to 405 in FIG. 9 are similar to the steps 201 to 203 in FIG. 6, and details are not described herein again.

It can be learned that this implementation indicates that the terminal device is allowed to explicitly report the first band combination, and further, the terminal device can explicitly report the first band combination. Optionally, the terminal device may indicate, to the network device by using the first indication information, whether the first band combination is explicitly reported. Therefore, the method for reporting band information described in this embodiment of this application helps reduce a processing load of the network device.

In some embodiments, referring to the embodiment shown in FIG. 6, if the third band combination includes a fifth band combination, the terminal device may not report the fifth band combination, and the first band combination set reported by the terminal device does not include the fifth band combination. Optionally, the terminal device may report the fifth band combination, and the first band combination set reported by the terminal device includes the fifth band combination.

To implement the functions in the methods for reporting band information provided in the embodiments of this application in FIG. 6 to FIG. 9, the network device and the terminal device may include a hardware structure and a software module, and implement the functions in a form of the hardware structure, the software module, or a combination of the hardware structure and the software module. A function in the foregoing functions may be performed in a manner of the hardware structure, the software module, or a combination of the hardware structure and the software module.

Figure 10:
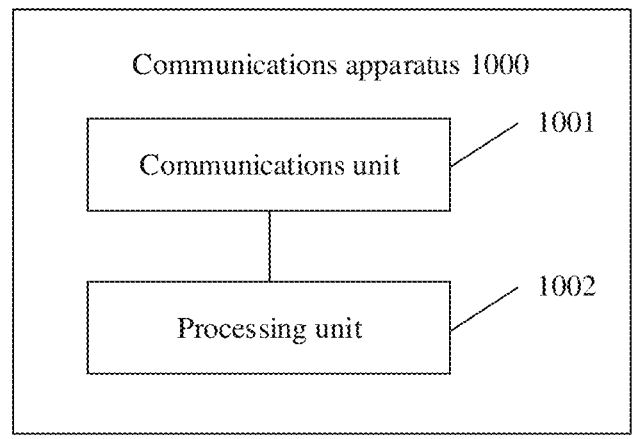
FIG. 10 is a schematic structural diagram of a communications apparatus according to an embodiment of this application.

FIG. 10 is a schematic structural diagram of a communications apparatus according to an embodiment of this application. A communications apparatus 1000 in FIG. 10 may include a transceiver unit 1001 and a processing unit 1002. The transceiver unit 1001 may include a sending unit and a receiving unit. The sending unit is configured to implement a sending function, the receiving unit is configured to implement a receiving function, and the transceiver unit 1001 may implement a sending function and/or a receiving function. The communications unit may also be described as a transceiver unit.

The communications apparatus 1000 may be a terminal device, an apparatus in a terminal device, or an apparatus that can be used together with a terminal device.

In an implementation, the communications apparatus 1000 includes the transceiver unit 1001 and the processing unit 1002.

The processing unit 1002 is configured to determine a first band combination set to be sent by the terminal device. The first band combination set includes a first band combination and a second band combination, the first band combination is a fallback band combination that has a same capability as the second band combination, and the first band combination and the second band combination correspond to different radio access technology types.

The transceiver unit 1001 is configured to send the first band combination set to the network device.

For related content of this implementation, refer to related content of the foregoing method embodiments. Details are not described herein again.

The communications apparatus 1000 may be a network device, or an apparatus in a network device, or an apparatus that can be used together with a network device.

In an implementation, the communications apparatus 1000 includes the transceiver unit 1001 and the processing unit 1002.

The transceiver unit is configured to receive a first band combination set from the terminal device. The first band combination set includes a first band combination and a second band combination, the first band combination is a fallback band combination that has a same capability as the second band combination, and the first band combination and the second band combination correspond to different radio access technology types.

The processing unit is configured to determine, based on the first band combination set, a second band combination set supported by the terminal device.

For related content of this implementation, refer to related content of the foregoing method embodiments. Details are not described herein again.

Figure 11:
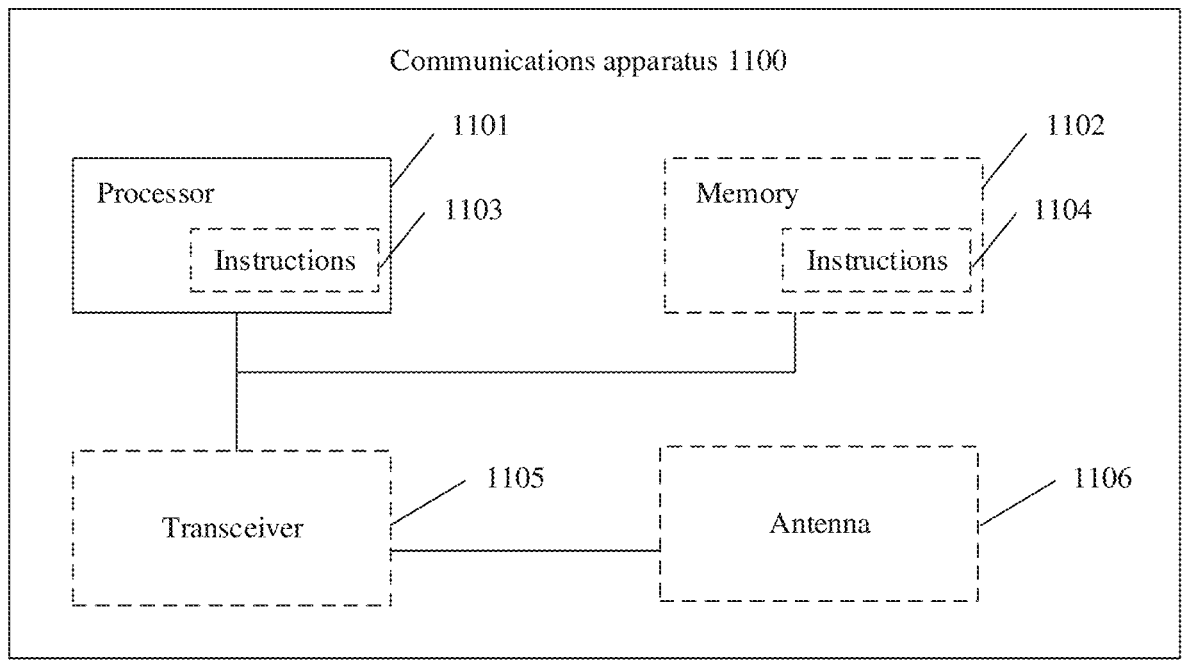
FIG. 11 is a schematic structural diagram of another communications apparatus according to an embodiment of this application.

FIG. 11 is a schematic structural diagram of another communications apparatus according to an embodiment of this application. The communications apparatus 1100 may be a network device, may be a terminal device, may be a chip, a chip system, a processor, or the like that supports a network device in implementing the foregoing method, or may be a chip, a chip system, a processor, or the like that supports a terminal device in implementing the foregoing method. The apparatus may be configured to implement the method described in the foregoing method embodiments. For details, refer to the descriptions in the foregoing method embodiments.

The communications apparatus 1100 may include one or more processors 1101. The processor 1101 may be a general purpose processor, a dedicated processor, or the like. For example, the processor 1101 may be a baseband processor or a central processing unit. The baseband processor may be configured to process a communications protocol and communications data. The central processing unit may be configured to: control the communications apparatus (for example, a base station, a baseband chip, a terminal, a terminal chip, a DU, or a CU), execute a software program, and process data of the software program.

Optionally, the communications apparatus 1100 may include one or more memories 1102. The memory 1102 stores instructions 1104, and the instructions may be run on the processor 1101, so that the communications apparatus 1100 performs the methods described in the foregoing method embodiments. Optionally, the memory 1102 may also store data. The processor 1101 and the memory 1102 may be disposed separately, or may be integrated together.

Optionally, the communications apparatus 1100 may further include a transceiver 1105 and an antenna 1106. The transceiver 1105 may be referred to as a transceiver unit, a transceiver, a transceiver circuit, or the like, and is configured to implement a transceiver function. The transceiver 1105 may include a receiver and a transmitter. The receiver may be referred to as a receiving machine, a receiver circuit, or the like, and is configured to implement a receiving function. The transmitter may be referred to as a transmitting machine, a transmitter circuit, or the like, and is configured to implement a sending function.

The communications apparatus 1100 is a terminal device. The transceiver 1105 is configured to perform the step 202 in FIG. 6, or the steps 301 and 304 in FIG. 8, or the steps 402 and 404 in FIG. 9. The processor is configured to perform the step 202 in FIG. 6, or the step 303 in FIG. 8, or the step 403 in FIG. 9.

The communications apparatus 1100 is a network device. The transceiver 1105 is configured to perform the step 203 in FIG. 6, or the steps 302 and 305 in FIG. 8, or the steps 401 and 405 in FIG. 9. The processor is configured to perform the step 203 in FIG. 6, or the step 305 in FIG. 8, or the step 405 in FIG. 9.

In another possible design, the processor 1101 may include a transceiver configured to implement receiving and sending functions. For example, the transceiver may be a transceiver circuit, an interface, or an interface circuit. A transceiver circuit, an interface, or an interface circuit configured to implement the receiving and sending functions may be separated, or may be integrated together. The transceiver circuit, the interface, or the interface circuit may be configured to read and write code/data; or the transceiver circuit, the interface, or the interface circuit may be configured to transmit or transfer a signal.

In still another possible design, optionally, the processor 1101 may store instructions 1103. When the instructions 1103 are run on the processor 1101, the communications apparatus 1100 is enabled to perform the method described in the foregoing method embodiments. The instructions 1103 may be fixed in the processor 1101. In this case, the processor 1101 may be implemented by hardware.

In another possible design, the communications apparatus 1100 may include a circuit. The circuit may implement the sending, receiving, or communication function in the foregoing method embodiments. The processor and the transceiver that are described in this application may be implemented on an integrated circuit (integrated circuit, IC), an analog IC, a radio frequency integrated circuit RFIC, a hybrid signal IC, an application-specific integrated circuit (application specific integrated circuit, ASIC), a printed circuit board (printed circuit board, PCB), an electronic device, or the like. The processor and the transceiver may alternatively be manufactured by using various IC technologies, for example, a complementary metal oxide semiconductor (complementary metal oxide semiconductor, CMOS), an n-type metal oxide semiconductor (nMetal-oxide-semiconductor, NMOS), a p-type metal oxide semiconductor (positive channel metal oxide semiconductor, PMOS), a bipolar junction transistor (Bipolar Junction Transistor, BJT), a bipolar CMOS (BiCMOS), silicon germanium (SiGe), and gallium arsenide (GaAs).

The communications apparatus in the foregoing embodiment may be a network device or a terminal device. However, a scope of the communications apparatus described in this application is not limited thereto, and a structure of the communications apparatus may not be limited by FIG. 11. The communications apparatus may be an independent device or may be a part of a relatively large device. For example, the communications apparatus may be:

(1) an independent integrated circuit (IC), a chip, or a chip system or subsystem;
(2) a set including one or more ICs, and optionally, the IC set may further include a storage component configured to store data and instructions;
(3) an ASIC, for example, a modem (Modem);
(4) a module that can be embedded in another device;
(5) a receiving machine, a terminal, an intelligent terminal, a cellular phone, a wireless device, a handheld phone, a mobile unit, a vehicle-mounted device, a network device, a cloud device, an artificial intelligence device, or the like;
(6) another device, or the like.

This application further provides a computer-readable storage medium. The computer-readable storage medium stores a computer program, and when the computer-readable storage medium is executed by a computer, functions of any one of the foregoing method embodiments are implemented.

This application further provides a computer program product. When the computer program product is executed by a computer, functions of any one of the foregoing method embodiments is implemented.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD), a semiconductor medium (for example, a solid-state drive (solid state disk, SSD)), or the like.

The correspondences shown in the table in this application may be configured, or may be predefined. Values of the information in the table are merely examples, and other values may be configured. This is not limited in this application. When a correspondence between information and each parameter is configured, not all correspondences shown in the table need to be configured. For example, in the table in this application, correspondences shown in some rows may alternatively not be configured. For another example, proper transformation and adjustments such as splitting and combination may be performed based on the foregoing tables. Names of the parameters shown in titles of the foregoing tables may also be other names that can be understood by a communications apparatus, and values or representation manners of the parameters may also be other values or representation manners that can be understood by the communications apparatus. During implementation of the foregoing tables, another data structure, such as an array, a queue, a container, a stack, a linear table, a pointer, a linked list, a tree, a graph, a structure, a class, a pile, or a hash table, may be used.

Predefine in this application may be understood as "define", "predefine", "store", "prestore", "pre-negotiate", "preconfigure", "solidify", or "pre-burn".

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on a particular application and a design constraint of the technical solutions. A person skilled in the art may use different methods to implement a described function for each particular application, but it should not be considered that the implementation goes beyond the scope of this application.

A person skilled in the art may clearly understand that, for the purpose of convenient and brief description, for detailed operating processes of the foregoing system, apparatus, and unit, refer to corresponding processes in the foregoing method embodiments, and details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A method, comprising:
receiving a terminal device capability enquiry message, wherein the terminal device capability enquiry message comprises a capability filter parameter, and the capability filter parameter indicates a range of requested terminal device capability information;

determining a second band combination set based on the terminal device capability enquiry message;

removing a first fallback band combination from the second band combination set, to obtain a first band combination set, wherein the first fallback band combination has a same capability as another band combination in the second band combination set, and the first fallback band combination is obtained by releasing at least one secondary cell or uplink configuration of at least one secondary cell from the another band combination, and wherein the first band combination set comprises a second fallback band combination, and the second fallback band combination is obtained by releasing a secondary cell group from the another band combination; and sending the first band combination set.

2. The method according to claim 1, wherein the first fallback band combination and the another band combination correspond to a same radio access technology type, and the second fallback band combination and the another band combination correspond to different radio access technology types.

3. The method according to claim 1, wherein the second fallback band combination is a new radio standalone (NR SA) band combination, and the another band combination is a new radio-evolved universal mobile telecommunications system terrestrial radio access-dual connectivity (NE-DC) band combination.

4. The method according to claim 1, wherein a radio access technology type corresponding to the second fallback band combination is new radio (NR), and a radio access technology type corresponding to the another band combination is evolved universal mobile telecommunications system terrestrial radio access-new radio (EUTRA-NR).

5. The method according to claim 1, wherein the capability filter parameter comprises band information, the band information requests a band combination in a specified range, and the second band combination set comprises a band combination that is in the specified range and that is supported by a terminal device.

6. A method, comprising:
sending a terminal device capability enquiry message, wherein the terminal device capability enquiry message comprises a capability filter parameter, and the capability filter parameter indicates a range of requested terminal device capability information;
receiving a first band combination set, wherein the first band combination set comprises a second fallback band combination, and the second fallback band combination is obtained by releasing a secondary cell group from another band combination; and
adding a first fallback band combination to the first band combination set, to obtain a second band combination set, wherein the first fallback band combination has a same capability as the another band combination, and is obtained by releasing at least one secondary cell or uplink configuration of at least one secondary cell from the another band combination.

7. The method according to claim 6, wherein the capability filter parameter comprises band information, the band information requests a band combination in a specified range, and the second band combination set comprises a band combination that is in the specified range and that is supported by a terminal device.

8. The method according to claim 6, wherein the first fallback band combination and the another band combination correspond to a same radio access technology type, and the second fallback band combination and the another band combination correspond to different radio access technology types.

9. The method according to claim 6, wherein the second fallback band combination is a new radio standalone (NR SA) band combination, and the another band combination is a new radio-evolved universal mobile telecommunications system terrestrial radio access-dual connectivity (NE-DC) band combination.

10. An apparatus, comprising:
a transceiver, configured to receive a terminal device capability enquiry message, wherein the terminal device capability enquiry message comprises a capability filter parameter, and the capability filter parameter indicates a range of requested terminal device capability information; and
a processor, configured to:
determine a second band combination set based on the terminal device capability enquiry message; and
remove a first fallback band combination from the second band combination set, to obtain a first band combination set, wherein the first fallback band combination has a same capability as another band combination in the second band combination set, and the first fallback band combination is obtained by releasing at least one secondary cell or uplink configuration of at least one secondary cell from the another band combination, and wherein the first band combination set comprises a second fallback band combination, and the second fallback band combination is obtained by releasing a secondary cell group from the another band combination; and
wherein the transceiver is further configured to send the first band combination set.

11. The apparatus according to claim 10, wherein the first fallback band combination and the another band combination correspond to a same radio access technology type, and the second fallback band combination and the another band combination correspond to different radio access technology types.

12. The apparatus according to claim 10, wherein the second fallback band combination is a new radio standalone (NR SA) band combination, and the another band combination is a new radio-evolved universal mobile telecommunications system terrestrial radio access-dual connectivity (NE-DC) band combination.

13. The apparatus according to claim 10, wherein a radio access technology type corresponding to the second fallback band combination is new radio (NR), and a radio access technology type corresponding to the another band combination is evolved universal mobile telecommunications system terrestrial radio access (EUTRA-NR).

14. The apparatus according to claim 10, wherein the capability filter parameter comprises band information, the band information requests a band combination in a specified range, and the second band combination set comprises a band combination that is in the specified range and that is supported by a terminal device.

15. An apparatus, comprising:
a transceiver, configured to send a terminal device capability enquiry message, wherein the terminal device capability enquiry message comprises a capability filter parameter, and the capability filter parameter indicates a range of requested terminal device capability information; and a processor, configured to:
- receive a first band combination set, wherein the first band combination set comprises a second fallback band combination, and the second fallback band combination is obtained by releasing a secondary cell group from another band combination; and
- add a first fallback band combination to the first band combination set, to obtain a second band combination set, wherein the first fallback band combination has a same capability as the another band combination, and is obtained by releasing at least one secondary cell or uplink configuration of at least one secondary cell from the another band combination.

16. The apparatus according to claim 15, wherein the capability filter parameter comprises band information, the band information requests a band combination in a specified range, and the second band combination set comprises a band combination that is in the specified range and that is supported by a terminal device.

17. The apparatus according to claim 15, wherein the first fallback band combination and the another band combination correspond to a same radio access technology type, and the first band combination and the another band combination correspond to different radio access technology types.

18. The apparatus according to claim 15, wherein the second fallback band combination is a new radio standalone (NR SA) band combination, and the another band combination is a new radio-evolved universal mobile telecommunications system terrestrial radio access-dual connectivity (NE-DC) band combination.

* * * * *

UNITED STATES PATENT AND TRADEMARK OFFICE
CERTIFICATE OF CORRECTION

PATENT NO. : 12,114,398 B2
APPLICATION NO. : 17/608072
DATED : October 8, 2024
INVENTOR(S) : Kuang et al.

It is certified that error appears in the above-identified patent and that said Letters Patent is hereby corrected as shown below:

In the Specification

In Column 12, Line 63, delete "NR_SA_BC3 (N_band2)" and insert -- NR SA BC3 (N_band2) --.

Signed and Sealed this
Twelfth Day of November, 2024

Katherine Kelly Vidal
*Director of the United States Patent and Trademark Office*